US012650858B2

(12) United States Patent
Takahashi et al.

(10) Patent No.: US 12,650,858 B2
(45) Date of Patent: Jun. 9, 2026

(54) INFORMATION PROCESSING DEVICE, INFORMATION PROCESSING METHOD, AND COMPUTER PROGRAM PRODUCT

(71) Applicants: KABUSHIKI KAISHA TOSHIBA, Tokyo (JP); TOSHIBA DIGITAL SOLUTIONS CORPORATION, Kawasaki (JP)

(72) Inventors: Nobumichi Takahashi, Kawasaki Kanagawa (JP); Misato Yatsushiro, Tokyo (JP); Minoru Inata, Kawasaki Kanagawa (JP); Satoko Takeshita, Chiba (JP); Kazushi Ikeda, Tokyo (JP); Kazuya Irisawa, Tokyo (JP); Satoru Suzumoto, Tokyo (JP); Satoshi Hashimoto, Tokyo (JP)

(73) Assignees: KABUSHIKI KAISHA TOSHIBA, Kawasaki (JP); TOSHIBA DIGITAL SOLUTIONS CORPORATION, Kawasaki (JP)

( * ) Notice: Subject to any disclaimer, the term of this patent is extended or adjusted under 35 U.S.C. 154(b) by 107 days.

(21) Appl. No.: 18/415,804

(22) Filed: Jan. 18, 2024

(65) Prior Publication Data

US 2024/0152365 A1     May 9, 2024

Related U.S. Application Data

(63) Continuation of application No. PCT/JP2022/028030, filed on Jul. 19, 2022.

(30) Foreign Application Priority Data

Jul. 19, 2021     (JP) ................................. 2021-119070

(51) Int. Cl.
| | | |
|---|---|---|
| *G06F 3/048* | (2013.01) | |
| *G06F 9/451* | (2018.01) | |
| *G06F 3/04847* | (2022.01) | |

(52) U.S. Cl.
CPC .......... *G06F 9/451* (2018.02); *G06F 3/04847* (2013.01)

(58) Field of Classification Search
None
See application file for complete search history.

(56) References Cited

U.S. PATENT DOCUMENTS

| | | | |
|---|---|---|---|
| 2008/0034215 A1 | 2/2008 | Wendling | |
| 2014/0108985 A1* | 4/2014 | Scott ...................... | G05B 15/02 |
| | | | 715/771 |

(Continued)

FOREIGN PATENT DOCUMENTS

| | | |
|---|---|---|
| JP | 2004-38759 A | 2/2004 |
| JP | 2004-213148 A | 7/2004 |

(Continued)

OTHER PUBLICATIONS

European Patent Office, Extended European Search Report in EP App. No. 22845910.3, 9 pages (May 22, 2025).

(Continued)

*Primary Examiner* — Thanh T Vu
(74) *Attorney, Agent, or Firm* — Finnegan, Henderson, Farabow, Garrett & Dunner, LLP

(57) ABSTRACT

An information processing device, an information processing method, and a program capable of creating a screen more efficiently are provided. An information processing device according to an embodiment includes a display control unit, a reception unit, and a storage control unit. The display control unit displays a display screen for arranging a plurality of components each of which has a predetermined (Continued)

function. The reception unit receives settings of the components designated using the display screen. The storage control unit stores, in a storage device, setting information indicating the settings received. The display control unit displays the display screen on which the components are set in accordance with the setting information.

10 Claims, 23 Drawing Sheets

(56) References Cited

U.S. PATENT DOCUMENTS

| | | | | |
|---|---|---|---|---|
| 2015/0188919 | A1* | 7/2015 | Belton, Jr. | H04L 63/0892 726/4 |
| 2015/0363925 | A1 | 12/2015 | Shibuya et al. | |
| 2019/0333129 | A1* | 10/2019 | Taniguchi | G06Q 30/0633 |
| 2020/0112612 | A1* | 4/2020 | Chandaria | H04L 67/133 |
| 2021/0003985 | A1 | 1/2021 | Takeuchi | |
| 2022/0155927 | A1* | 5/2022 | Yamamoto | G06F 3/0484 |

FOREIGN PATENT DOCUMENTS

| | | | |
|---|---|---|---|
| JP | 2008-234122 | A | 10/2008 |
| JP | 2014-26547 | A | 2/2014 |
| JP | 2014-142697 | A | 8/2014 |
| JP | 2018-73317 | A | 5/2018 |
| JP | 6779101 | B2 | 11/2020 |
| JP | 7763022 | B2 | 10/2025 |
| KR | 10-2010-0070007 | A | 6/2010 |
| KR | 10-2019-0113762 | A | 10/2019 |

OTHER PUBLICATIONS

Ni Apps, "Data Flow Programming Basics," https://www.youtube.com/watch?v=PqxStfwjQoQ, XP:93276126, 2 pages (2010).
Me4031, "Basic Data Acquisition using LabView," https://www.youtube.com/watch?v=GBhJk5Tnshc, XP:93276611, 2 pages (2012).
National Instruments Corporation, "Getting Started with LabVIEW Virtual Instruments," XP:002422858, 70 pages.
Korean Intellectual Property Office, Office Action in KR App. No. 10-2024-7001155 (Jul. 18, 2025).
Intellectual Property India, Office action in IN App. No. 202417003610 (May 27, 2025).

\* cited by examiner

FIG.2

| SETTING ITEM | DESCRIPTION |
|---|---|
| CARD ID | IDENTIFICATION ID OF CARD |
| GROUP ID | ID OF GROUP TO WHICH CARD BELONGS |
| GADGET | TYPE OF GADGET TO BE ASSOCIATED WITH CARD |
| CARD NAME | NAME OF CARD |
| TITLE | TITLE DISPLAYED AT HEADER OF CARD |
| ICON IMAGE | ICON IMAGE DISPLAYED AT HEADER OF CARD |
| MINIMUM HEIGHT | MINIMUM HEIGHT OF CARD |
| MINIMUM WIDTH | MINIMUM WIDTH OF CARD |
| DISPLAY OR HIDE CARD | DISPLAY OR HIDE SETTING OF CARD |
| MODIFY SIZE OF CARD | SETTING OF WHETHER OR NOT CARD CAN BE RESIZED |
| MODIFY POSITION OF CARD | SETTING OF WHETHER OR NOT POSITION OF CARD CAN BE MODIFIED |
| MAXIMIZE CARD | SETTING OF WHETHER OR NOT CARD CAN BE MAXIMIZED FOR DISPLAY |
| MAINTAIN ASPECT RATIO | SETTING OF WHETHER OR NOT TO MAINTAIN ASPECT RATIO OF CARD |
| BACKGROUND COLOR | BACKGROUND COLOR OF CARD |
| FRAME COLOR | FRAME COLOR OF CARD |
| DISPLAY HEADER | SETTING OF WHETHER OR NOT TO DISPLAY HEADER OF CARD |
| BACKGROUND COLOR OF HEADER | BACKGROUND COLOR OF HEADER OF CARD |
| FRAME COLOR OF HEADER | FRAME COLOR OF HEADER OF CARD |
| Z | SETTING OF z-index OF CARD |
| CSS STYLE | SETTING OF CSS STYLE TO BE ALLOCATED TO CARD |
| CSS CLASS | SETTING OF CSS CLASS TO BE ALLOCATED TO CARD |
| LIFE CYCLE EVENT | SETTING OF EVENT THAT OPERATES WHEN CARD IS DISPLAYED OR HIDDEN |
| DISABLE BLOCKING IN EDIT MODE | SETTING OF WHETHER OR NOT TO DISPLAY BLOCKING OF CARDS IN EDIT MODE |
| SUBSCRIPTION TOPIC | SETTING OF EVENT SUBSCRIBED BY CARD |
| LOCALIZED UNIQUE SETTING KEY | KEY SETTING OF DICTIONARY |

FIG.3

```
{
  "basicSetting": {
    "header": true,
    "headerBackground": "#57575a",
    "titleName": "DISPLAY DIAGRAM",
(OMITTED)
  },
  "eventEntries": [
    {
      "id": "update-diagram",
      "methods": [
        {
          "targetId": "diagram",
          "methodType": "put",
          "resource": "diagram/properties",
          "returnResource": "",
          "script": ""
        }
      ]
    },
    {
      "id": "item-property-changed",
      "methods": [
        {
          "targetId": "diagram",
          "methodType": "call",
          "resource": "",
          "returnResource": "",
          "script": ""
        }
      ]
    },
(OMITTED)
  ],
(OMITTED)
}
```

FIG.4

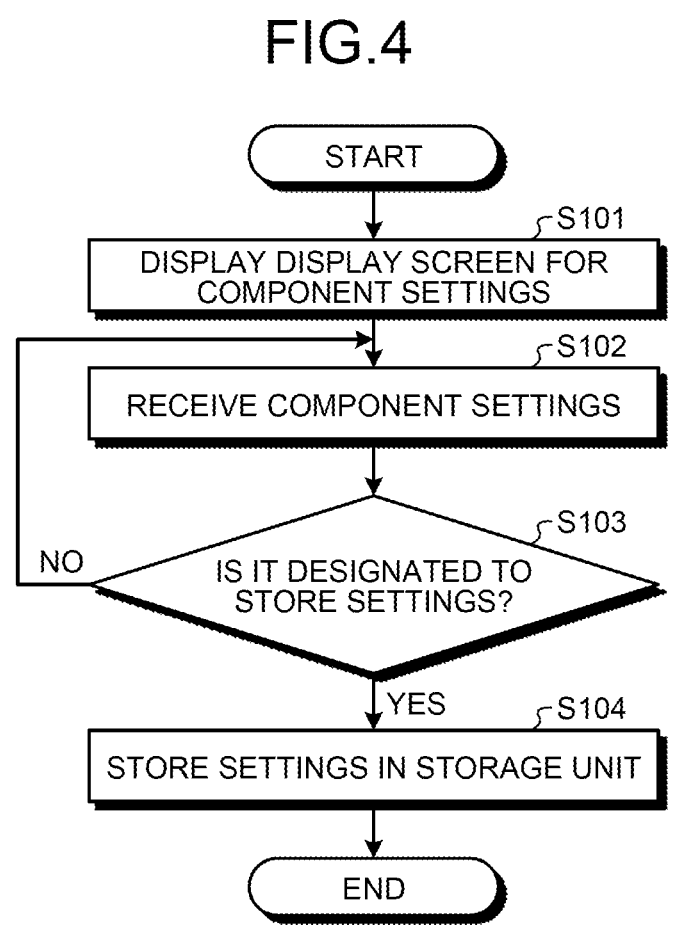

```
        ┌──────────────┐
        │    START     │
        └──────────────┘
               │
               ▼            ┌S101
┌──────────────────────────────┐
│   DISPLAY DISPLAY SCREEN FOR  │
│     COMPONENT SETTINGS        │
└──────────────────────────────┘
               │
               ▼            ┌S102
┌──────────────────────────────┐
│  RECEIVE COMPONENT SETTINGS   │
└──────────────────────────────┘
               │
               ▼            ┌S103
         ◇───────────◇
   NO   ╱ IS IT DESIGNATED ╲
  ◀─────  TO STORE SETTINGS? 
         ╲                 ╱
          ◇───────────◇
               │ YES        ┌S104
               ▼
┌──────────────────────────────┐
│  STORE SETTINGS IN STORAGE    │
│            UNIT               │
└──────────────────────────────┘
               │
               ▼
        ┌──────────────┐
        │     END      │
        └──────────────┘
```

FIG.5

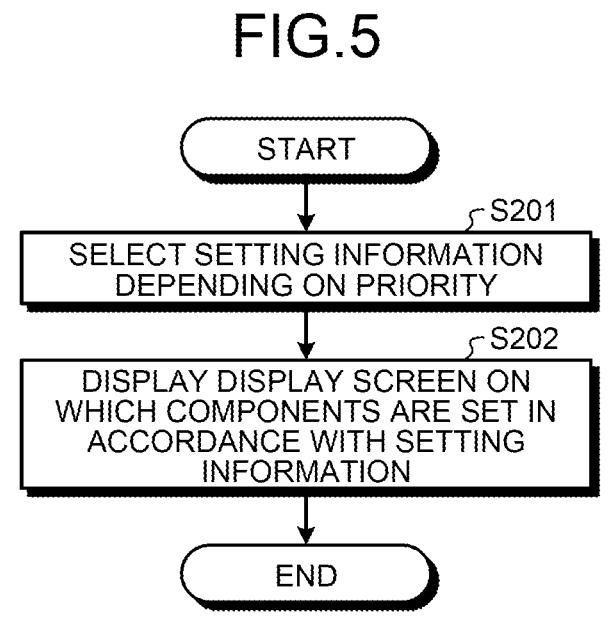

```
        ┌─────────────┐
        │    START    │
        └──────┬──────┘
               │
               ▼                    ⌐S201
┌──────────────────────────────────┐
│   SELECT SETTING INFORMATION      │
│     DEPENDING ON PRIORITY         │
└──────────────┬───────────────────┘
               │
               ▼                    ⌐S202
┌──────────────────────────────────┐
│   DISPLAY DISPLAY SCREEN ON        │
│ WHICH COMPONENTS ARE SET IN        │
│  ACCORDANCE WITH SETTING           │
│        INFORMATION                 │
└──────────────┬───────────────────┘
               │
               ▼
        ┌─────────────┐
        │     END     │
        └─────────────┘
```

Figure 8:
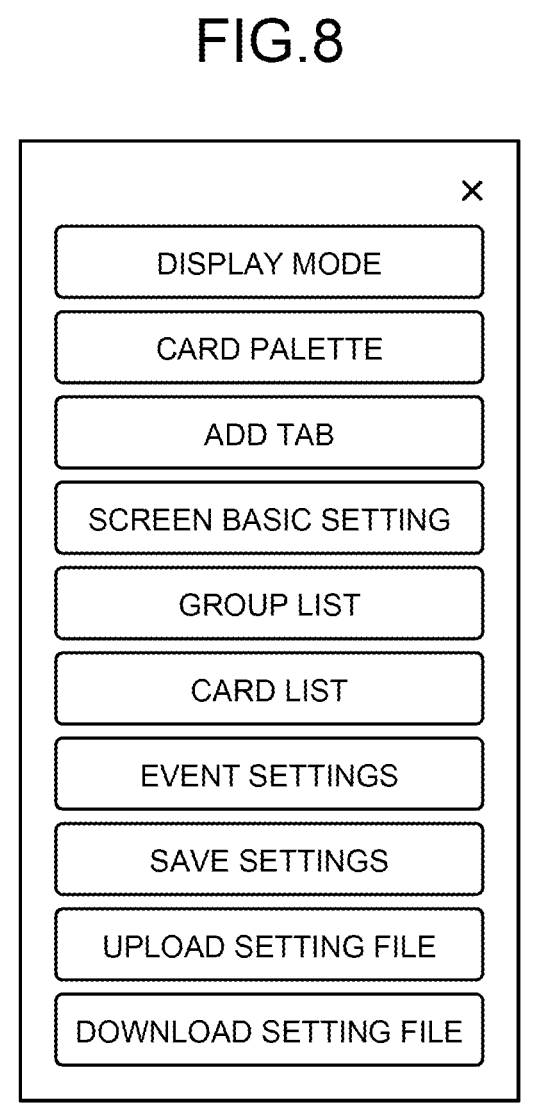

DISPLAY MODE

CARD PALETTE

ADD TAB

SCREEN BASIC SETTING

GROUP LIST

CARD LIST

EVENT SETTINGS

SAVE SETTINGS

UPLOAD SETTING FILE

DOWNLOAD SETTING FILE

FIG.10

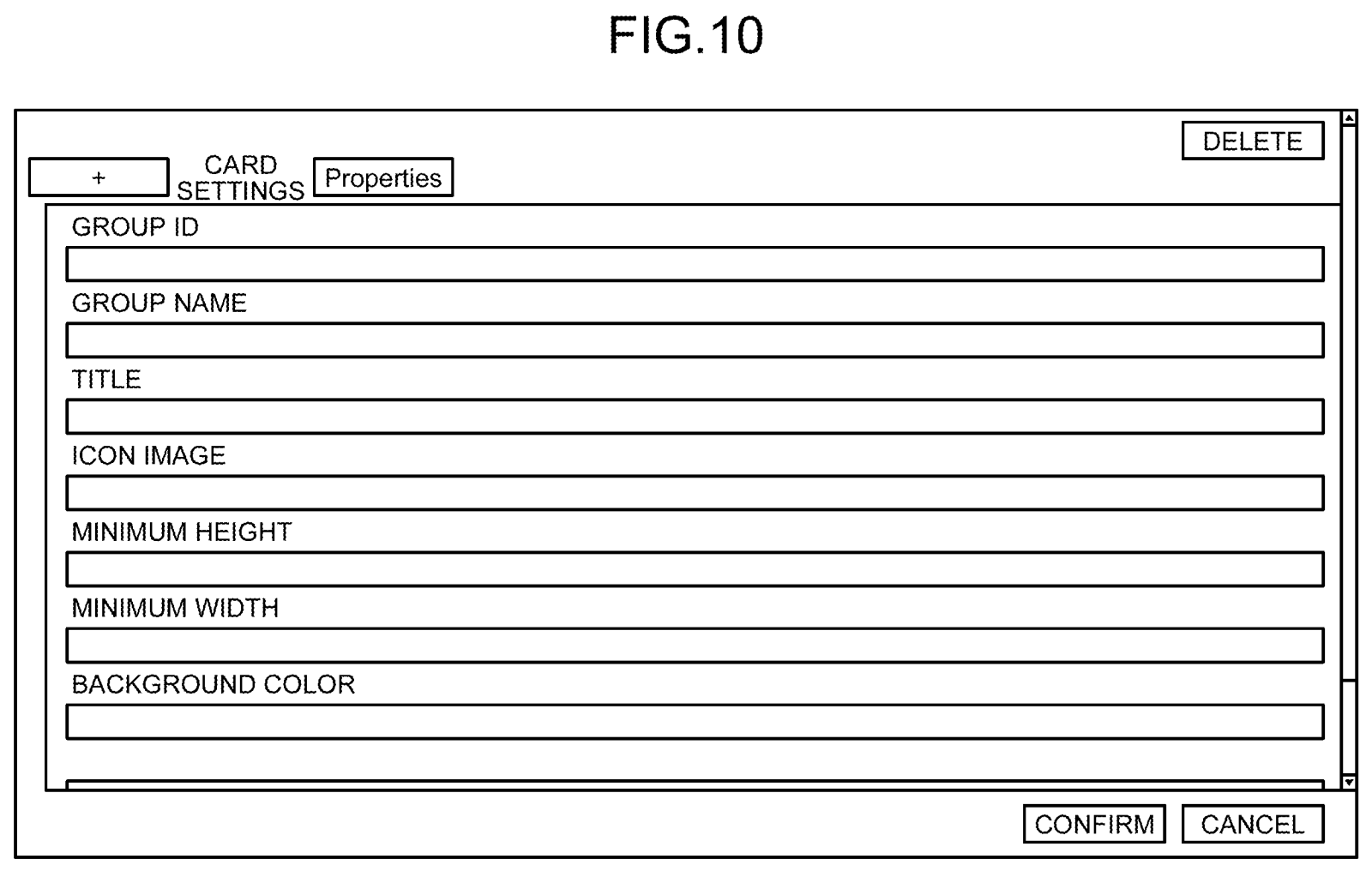

CARD SETTINGS [Properties]

[+]

DELETE

GROUP ID

GROUP NAME

TITLE

ICON IMAGE

MINIMUM HEIGHT

MINIMUM WIDTH

BACKGROUND COLOR

CONFIRM    CANCEL

FIG.11

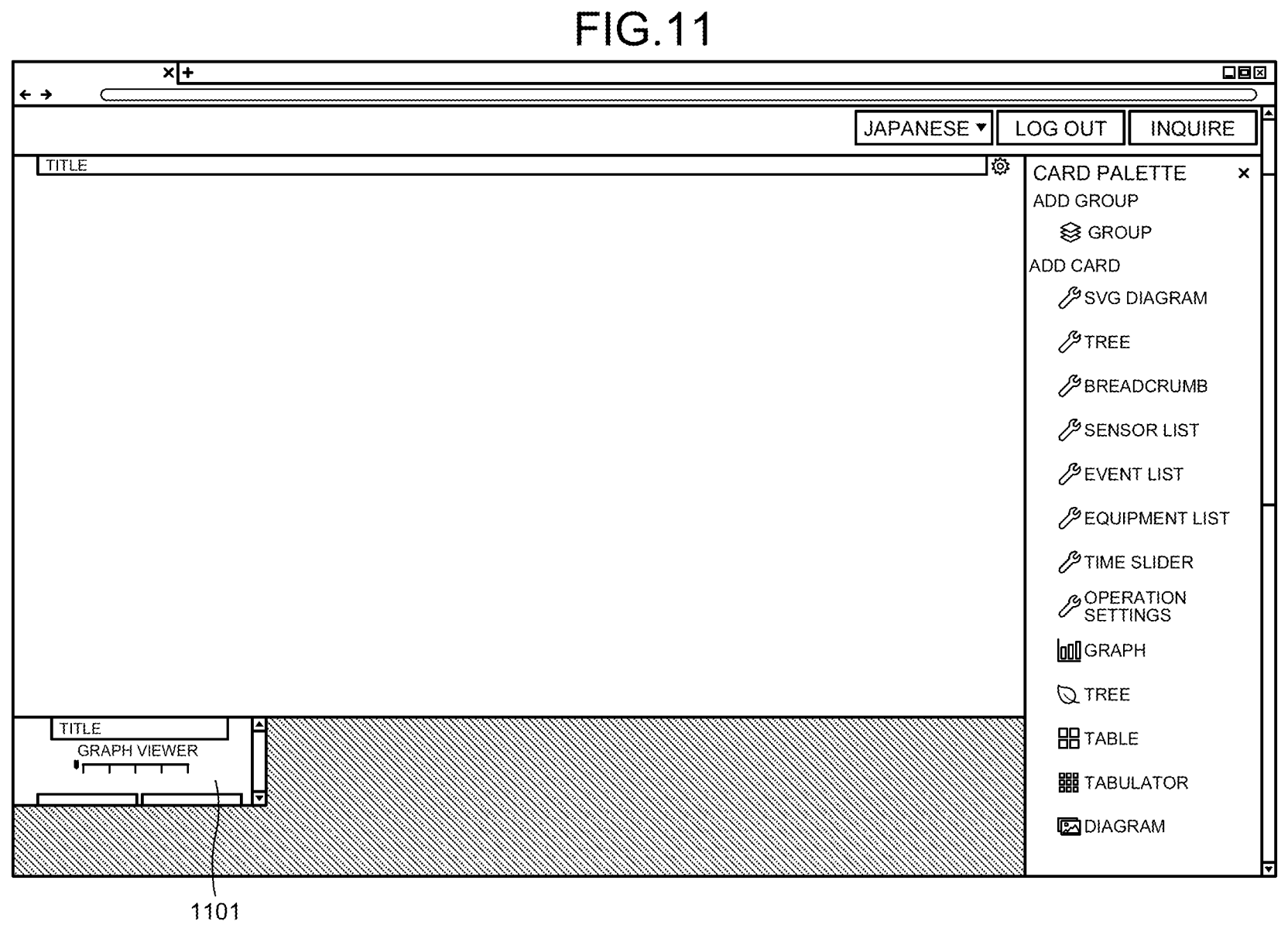

JAPANESE ▼     LOG OUT     INQUIRE

CARD PALETTE                                                                ✕

ADD GROUP

⬙ GROUP

ADD CARD

⌇ SVG DIAGRAM

⌇ TREE

⌇ BREADCRUMB

⌇ SENSOR LIST

⌇ EVENT LIST

⌇ EQUIPMENT LIST

⌇ TIME SLIDER

⌇ OPERATION
   SETTINGS

⊞ GRAPH

◌ TREE

⊞ TABLE

▦ TABULATOR

▣ DIAGRAM

TITLE

TITLE
GRAPH VIEWER

Figure 12:
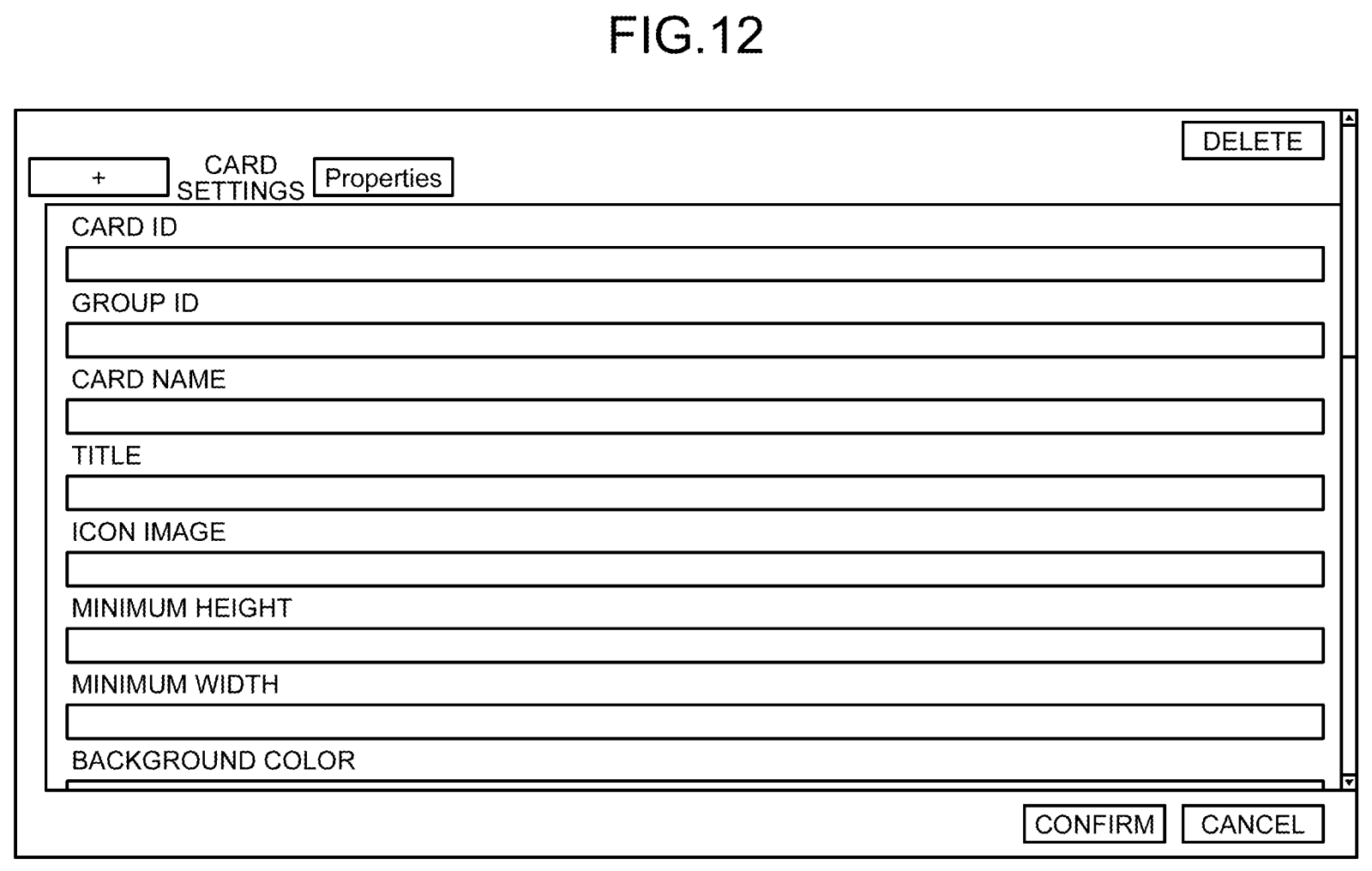

CARD
SETTINGS  Properties

+

CARD ID

GROUP ID

CARD NAME

TITLE

ICON IMAGE

MINIMUM HEIGHT

MINIMUM WIDTH

BACKGROUND COLOR

DELETE

CONFIRM  CANCEL

FIG.15 item-property-changed id item-property-changed

Figure 15:
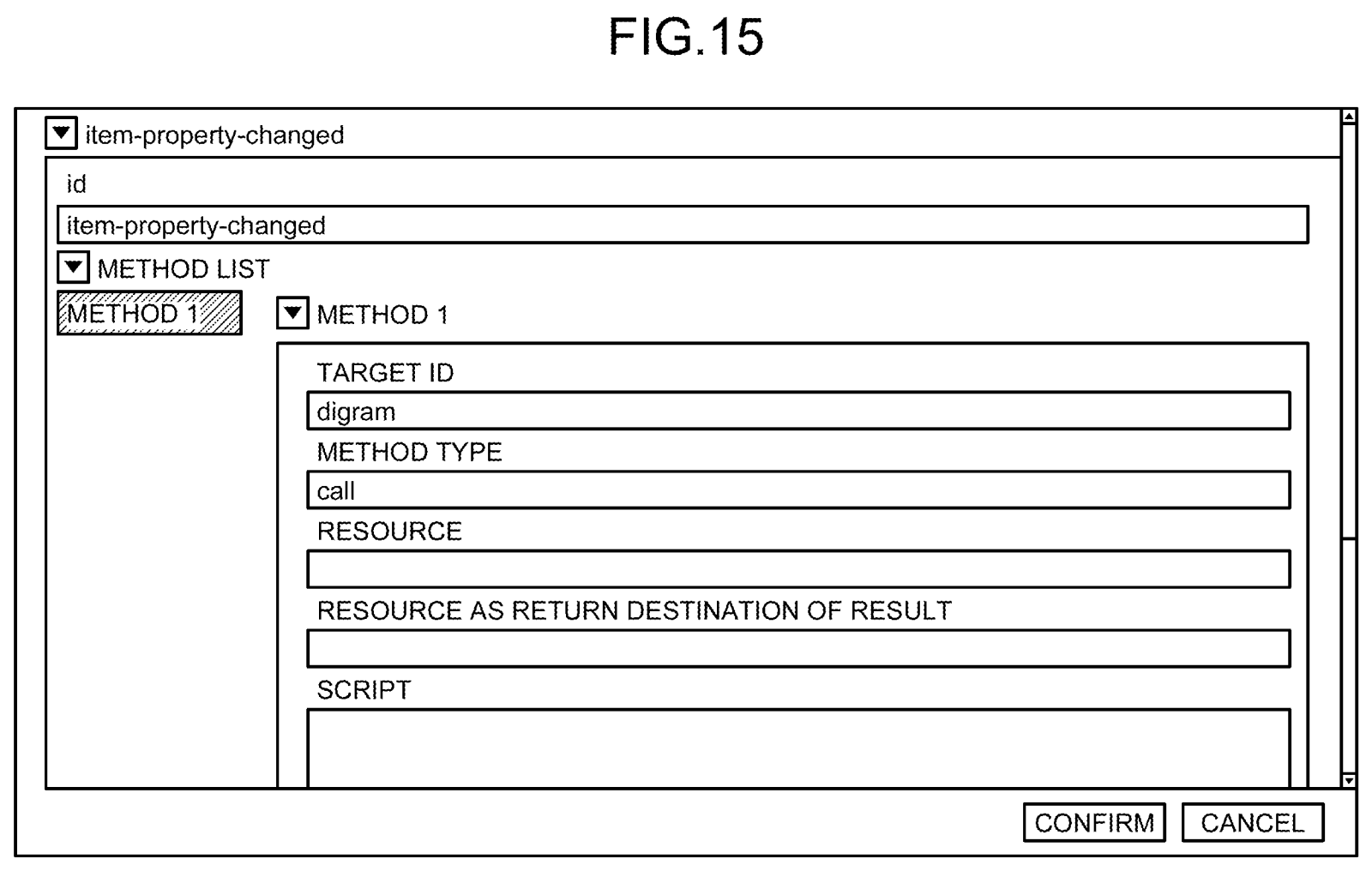

METHOD LIST

METHOD 1

METHOD 1

TARGET ID digram

METHOD TYPE call

RESOURCE

RESOURCE AS RETURN DESTINATION OF RESULT

SCRIPT

CONFIRM

CANCEL

FIG.19

BASE (COOPERATION A Gr) > JAPAN > FACTORY 〇〇

FIG.20

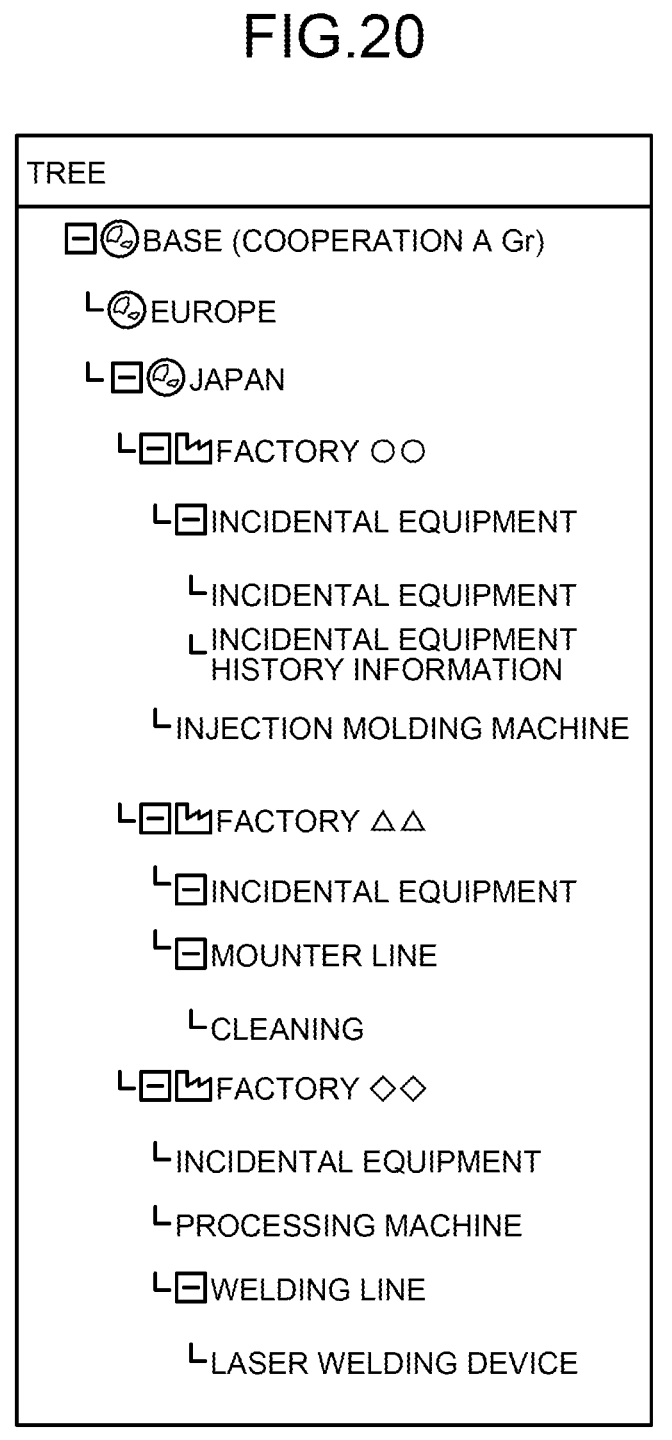

```
┌─────────────────────────────────────────┐
│ TREE                                     │
├─────────────────────────────────────────┤
│   ⊟ⓐBASE (COOPERATION A Gr)              │
│     └ⓐEUROPE                             │
│     └⊟ⓐJAPAN                             │
│       └⊟🏭FACTORY ○○                      │
│         └⊟INCIDENTAL EQUIPMENT           │
│           └INCIDENTAL EQUIPMENT          │
│           └INCIDENTAL EQUIPMENT          │
│            HISTORY INFORMATION           │
│          └INJECTION MOLDING MACHINE      │
│                                          │
│       └⊟🏭FACTORY △△                      │
│         └⊟INCIDENTAL EQUIPMENT           │
│         └⊟MOUNTER LINE                   │
│           └CLEANING                      │
│       └⊟🏭FACTORY ◇◇                      │
│         └INCIDENTAL EQUIPMENT            │
│         └PROCESSING MACHINE              │
│         └⊟WELDING LINE                   │
│           └LASER WELDING DEVICE          │
└─────────────────────────────────────────┘
```

FIG.21

| Event | Device Id | Device group Id | Severity Level | Severity | Date |
|-------|-----------|-----------------|----------------|----------|------|
| SENSOR LIST | | | | | |
| error1 | device 001 | device group 02 | 1 | Low | 2020/11/24 00:00:00 |
| error1 | device 002 | device group 02 | 2 | Medium | 2020/11/24 00:00:00 |
| error1 | device 003 | device group 02 | 3 | High | 2020/11/24 00:00:00 |
| error1 | device 003 | device group 02 | 1 | Low | 2020/11/24 00:00:00 |
| error1 | device 003 | device group 02 | 1 | Low | 2020/11/24 00:00:00 |
| error1 | device 003 | device group 02 | 1 | Low | 2020/11/24 00:00:00 |
| error1 | device 003 | device group 02 | 1 | Low | 2020/11/24 00:00:00 |
| error1 | device 003 | device group 02 | 1 | Low | 2020/11/24 00:00:00 |

FIG.23

```
   ┌──51          ┌──52          ┌──53
┌──────────┐  ┌──────────┐  ┌──────────┐
│          │  │          │  │          │
│   CPU    │  │   ROM    │  │   RAM    │
│          │  │          │  │          │
└──────────┘  └──────────┘  └──────────┘
      ↕             ↕             ↕    ┌──61
─────────────────────────────────────────
          ↕
      ┌──54
┌──────────────┐
│  COMMUNI-    │
│  CATION I/F  │
└──────────────┘
```

INFORMATION PROCESSING DEVICE, INFORMATION PROCESSING METHOD, AND COMPUTER PROGRAM PRODUCT

CROSS-REFERENCE TO RELATED APPLICATIONS

This application is a continuation of International Application No. PCT/JP2022/028030 filed on Jul. 19, 2022, which based upon and claims the benefit of priority from Japanese Patent Application No. 2021-119070 filed on Jul. 19, 2021; the entire contents of which are incorporated herein by reference.

FIELD

Embodiments of the present disclosure relate generally to an information processing device, an information processing method, and a computer program product.

BACKGROUND

There is known a technology for developing a screen to be operated by a user by using predetermined user interface (UI) components. It may be necessary to arrange a plurality of components on the screen, to manage the plurality of components in association with each other, to cause the plurality of components to operate in cooperation, and others. As such, it is desirable to enable efficiently developing a screen containing such a plurality of components.

BRIEF DESCRIPTION OF THE DRAWINGS

FIG. 2 is a diagram illustrating an example of setting information.

FIG. 3 is a diagram illustrating an example of setting information in a JSON format.

FIG. 4 is a flowchart illustrating an example of screen creation processing in the embodiment.

FIG. 5 is a flowchart illustrating an example of display processing in the embodiment.

FIG. 8 is a diagram illustrating a structure example of a setting menu.

FIG. 10 is a diagram illustrating an example of a card setting screen.

FIG. 11 is a diagram illustrating a display example of a card before being added to a group.

FIG. 12 is a diagram illustrating an example of a card setting screen in a case where a setting menu button is pressed.

FIG. 15 is a diagram illustrating an example of a setting screen for setting cooperation between components.

FIG. 19 is a diagram illustrating a display example of a breadcrumb card.

FIG. 20 is a diagram illustrating a display example of a tree card.

FIG. 21 is a diagram illustrating a display example of a sensor list card.

FIG. 23 is an explanatory diagram illustrating a hardware configuration example of an information processing device according to the embodiment.

DETAILED DESCRIPTION

Figure 1:
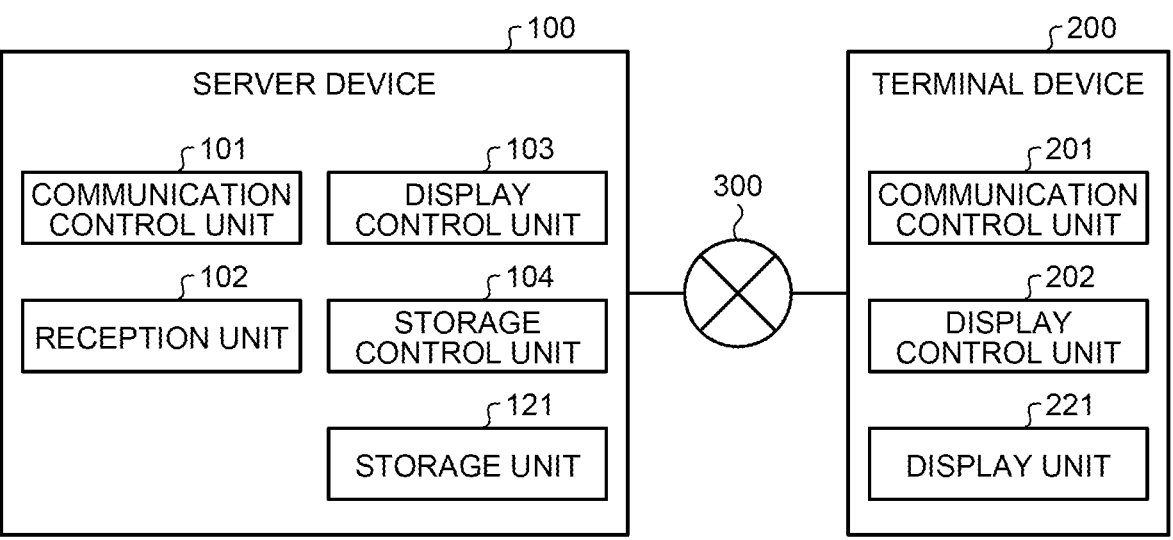
FIG. 1 is a block diagram illustrating an example of a configuration of an information processing system according to an embodiment.

An object of embodiments of the present disclosure is to provide an information processing device, an information processing method, and a computer program product capable of more efficiently creating a screen.

An information processing device according to an embodiment includes one or more hardware processors configured to function as a display control unit, a reception unit, and a storage control unit. The display control unit displays a display screen for arranging a plurality of components each of which has a predetermined function. The reception unit receives settings of the components designated using the display screen. The storage control unit stores, in a storage device, setting information indicating the settings received. The display control unit displays the display screen on which the components are set in accordance with the setting information.

Hereinafter, a preferred embodiment of an information processing device according to the present disclosure will be described in detail with reference to the accompanying drawings.

In the present embodiment, it is made possible to develop a screen more efficiently by standardizing main functions used in a display screen to be operated by a user as UI components. In principle, a screen can be developed by setting components using a graphical user interface (GUI). In the GUI, for example, arrangement of components, setting of each component, grouping of a plurality of components, setting of cooperation of a plurality of components, and the like can be performed. Therefore, for example, the coding work can be minimized, and the screen can be created more efficiently.

Hereinafter, a case where a display screen for displaying and managing data (such as sensing data) collected from one or more edge devices (an example of an electronic device) is created will be described as an example. An applicable screen is not limited to this and may be used in any other device or system.

The data is collected by an information processing system configured as follows, for example. That is, the information processing system includes one or more edge devices, a server device (platform), and a service provision device that provides services using data. The information processing system may include a device (integrated data infrastructure) in which a server device and a service provision device are integrated.

An edge device includes one or more sensors (detection devices) and has a function of collecting sensing data from the sensors, a function of transmitting the sensing data to the server device, and others.

The server device has a function of collecting sensing data from one or more edge devices, a function of analyzing the collected data, and others. The server device is configured in a cloud environment, for example.

The service provision device provides services using collected data, an analysis result by the server device, and others. The service provision device is configured in a cloud environment, for example.

The information processing system may be implemented as a cyber physical system (CPS) that analyzes data collected in the real world (physical) in a cyber world (cyber) and feeds back an analysis result to the real world (physical). The information processing system is not limited to this and may be any system.

Incidentally, definitions of major terms used in the following embodiments will be described.

Resource: represents a unit of an asset (company, organization, equipment, device, etc.) to be managed. Resources are managed in a tree structure, for example. Moreover, a resource is uniquely identified by a resource ID.

Card: represents an element (component) such as a graph or a table included in a screen.

Group: represents a collective unit of a plurality of cards.

Event: represents an action occurring for each card.

It is possible to set to include another card in a certain card. A card included in a card may be referred to as a sub-card. A card and one or more sub-cards included in the card may be classified into one group.

FIG. 1 is a block diagram illustrating an example of a configuration of an information processing system according to an embodiment. As illustrated in FIG. 1, the information processing system according to the embodiment has a configuration in which a server device 100 as an information processing device and a terminal device 200 are connected via a network 300.

The network 300 is, for example, the Internet or a local area network (LAN) but may be any other form of network. The network 300 may be any of a wireless network, a wired network, and a network in which a wireless network and a wired network are mixed.

The server device 100 is a device having a screen creation function using components and is configured in, for example, a cloud environment. The server device 100 can be configured to correspond to any one of the server device, the service provision device, and the integrated data infrastructure described above.

The terminal device 200 is a device for performing an operation of creating a screen using the creation function included in the server device 100. Although only one terminal device 200 is illustrated in FIG. 1, the information processing system may include two or more terminal devices 200.

Note that the information processing system may include a device having functions of both the server device 100 and the terminal device 200.

The server device 100 includes a storage unit 121, a communication control unit 101, a reception unit 102, a display control unit 103, and a storage control unit 104.

The storage unit 121 is a storage device that stores various types of information used in the server device 100. For example, the storage unit 121 stores information regarding components that can be included in a screen and setting information representing settings of one or more components included in a display screen. The information regarding components includes information such as a function of each component such as key performance indicators (KPIs) card and a time slider card to be described later, and types for identifying the components.

FIG. 2 is a diagram illustrating an example of setting information. As illustrated in FIG. 2, the setting information may include a plurality of setting items. As the setting items, in addition to a card ID for identifying a card (component), the position and the size of the card on the screen can be set. Furthermore, in the present embodiment, a "subscription topic" indicating cooperation between a plurality of cards can be set as a setting item. For example, in a case where a certain card operates in response to an event or others by another card, information for specifying the event is set to the subscription topic.

The setting information in FIG. 2 is an example, and other setting information may be used. The setting information may be described in any format and can be described using, for example, JavaScript (registered trademark) Object Notation (JSON). FIG. 3 is a diagram illustrating an example of setting information in a JSON format.

FIG. 3 is an example of setting information in the JSON format including some of settings of a component including an image (diagram) created by another drawing tool or the like. In FIG. 3, basic settings (basicSetting) of a component and setting of an event (eventEntries) are illustrated as examples; however, settings related to other setting items may be included. The image may be created in any format. For example, the image to be included as the settings of the component may be created in a format in accordance with scalable vector graphics (SVG).

In FIG. 3, as the types of events, an event "item-property-changed" issued when an input value changes and an event "update-diagram" issued when display is updated are illustrated as examples. The events are not limited thereto, and any event may be used.

Returning to FIG. 1, the storage unit 121 may further store user information indicating the authority and the like of a user. The user information can be used, for example, to determine whether or not the user is authorized to set components.

The storage unit 121 can be configured by any generally-used storage medium such as a flash memory, a memory card, a random access memory (RAN), a hard disk drive (HDD), or an optical disc.

The communication control unit 101 controls communication with an external device such as the terminal device 200. For example, the communication control unit 101 transmits display information for displaying a display screen on a display unit 221 (described later) of the terminal device 200 to the terminal device 200. In addition, the communication control unit 101 receives setting information indicating settings of a component designated using the display screen from the terminal device 200.

The display information for displaying the display screen may be in any format. For example, in a case where a display screen is displayed by a browser, the display information may be described in a hypertext markup language (HTML).

The reception unit 102 receives input of various types of information used in various types of processing by the server device 100. For example, the reception unit 102 receives the setting information received by the communication control unit 101.

The display control unit 103 controls display of a screen on the display unit 221 or the like of the terminal device 200.

For example, the display control unit 103 controls processing of displaying a display screen for arranging a plurality of components (cards) having predetermined functions on the display unit 221. In a case where a component is set by the terminal device 200, the display control unit 103 displays a display screen on which the component is set in accordance with the setting information.

The display screen may include a plurality of components (first component, second component, etc.). In this case, the display control unit 103 may further display a setting screen for setting cooperation information indicating an operation of another component (second component) corresponding to an operation of a certain component (first component). Furthermore, for example, in a case where the cooperation information is set by the terminal device 200, the display control unit 103 controls the display of the display screen in such a manner that each component operates in accordance with the cooperation information.

The display control unit 103 may display, to a user who is authorized to set a component, a display screen containing a function for setting the component. Whether or not the user is authorized can be determined using, for example, the user information stored in the storage unit 121.

The display screen may be created for some or all of the followings.

(A1) For each user (A2) For each authority (role) given to a user (A3) All users (a display screen common to all users is created)

For example, the setting information may include setting information defined for each of a plurality of users (first setting information), setting information defined for each authority (second setting information), and setting information defined in common for a plurality of users (third setting information).

In this case, for example, the storage unit 121 may store information indicating the type of the setting information (for example, information indicating which of (A1), (A2), and (A3) the setting information corresponds to) for each user. In addition, the display control unit 103 may display a display screen on which components are set in accordance with any setting information selected depending on a priority determined for each of a plurality of pieces of setting information. The priority is set to be higher in the order of (A1), (A2), and (A3), for example.

As described above, the display control unit 103 displays the display screen in accordance with the component setting information set for a user or others. The display control unit 103 includes, for example, a function (UI infrastructure) of reading the setting information described in the JSON format as illustrated in FIG. 3 from the storage unit 121 and creating and displaying the display screen in accordance with the setting information that is read out.

The storage control unit 104 controls storage of various types of information in the storage unit 121. For example, the storage control unit 104 stores the setting information received by the reception unit 102 in the storage unit 121. In a case where cooperation information is set, the storage control unit 104 may store the setting information including the cooperation information in the storage unit 121.

Each of the above units (the communication control unit 101, the reception unit 102, the display control unit 103, and the storage control unit 104) is implemented by, for example, one or a plurality of processors. For example, each of the above units may be implemented by causing a processor such as a central processing unit (CPU) to execute a program, namely, by software. Each of the above units may be implemented by a processor such as a dedicated integrated circuit (IC), namely, by hardware. Each of the above units may be implemented by using software and hardware in combination. In the case of using a plurality of processors, each of the processors may implement one of the units or may implement two or more of the units.

Next, a functional configuration example of the terminal device 200 will be described. As illustrated in FIG. 1, the terminal device 200 includes the display unit 221, a communication control unit 201, and a display control unit 202.

The display unit 221 is a display device for displaying various types of information and can be implemented by a liquid crystal display, a touch panel, or the like.

The communication control unit 201 controls communication with an external device such as the server device 100. For example, the communication control unit 201 receives display information for displaying a display screen on the display unit 221 from the server device 100. In addition, the communication control unit 201 transmits setting information indicating the setting of a component designated using the display screen to the server device 100.

The display control unit 202 controls display of a screen on the display unit 221. For example, the display control unit 202 displays the display screen on the basis of the display information transmitted from the server device 100.

Each of the above units (the communication control unit 201 and the display control unit 202) is implemented by, for example, one or a plurality of processors. For example, each of the above units may be implemented by causing a processor such as a CPU to execute a program, namely, by software. Each of the above units may be implemented by a processor such as a dedicated IC, namely, by hardware. Each of the above units may be implemented by using software and hardware in combination. In the case of using a plurality of processors, each of the processors may implement one of the units or may implement two or more of the units.

Next, screen creation processing by the server device 100 according to the embodiment configured in this manner will be described. FIG. 4 is a flowchart illustrating an example of the screen creation processing in the embodiment.

The display control unit 103 displays a display screen for component settings (step S101). For example, the display control unit 103 transmits display information for displaying the display screen to the terminal device 200 via the communication control unit 101 and causes the display control unit 202 of the terminal device 200 to display the display screen based on the display information.

The display screen may be a screen on which no component is set or may be a default screen on which a component is set in advance. The default screen is, for example, a display screen in which components are set in accordance with setting information (default setting information) determined in advance by an administrator or the like. The user of the terminal device 200 can set various components using the display screen that is displayed. Details of a method of setting a component will be described later.

In a case where the setting of a component is performed by the user using the display screen, the setting information indicating the setting of the component designated by the user is transmitted by the communication control unit 201 of the terminal device 200 and received by the communication control unit 101 of the server device 100. The reception unit 102 receives the setting information received in this manner (step S102).

On the display screen, it can be designated to store the setting information of components that are set so far. The reception unit 102 determines whether or not it is designated to store the component settings (step S103). If it is not designated (step S103: No), the process returns to step S102, and the processing is repeated.

In a case where it is designated to store the settings (step S103: Yes), the storage control unit 104 stores, in the storage unit 121, the setting information that are received so far (step S104) and ends the screen creation processing.

Next, display processing of displaying the created display screen will be described. FIG. 5 is a flowchart illustrating an example of display processing in the embodiment.

In a case where a plurality of pieces of setting information is set for the user to whom the display screen is to be displayed, the display control unit 103 selects setting information with the highest priority among the plurality of pieces of setting information (step S201). Note that, in a case where a plurality of pieces of setting information cannot be set, selection of setting information based on the priority may not be performed. In this case, the display control unit 103 is only required to read the setting information set for the user from the storage unit 121.

The display control unit 103 displays a display screen on which components are set in accordance with the selected setting information (step S202). For example, the display control unit 103 transmits display information for displaying the display screen on which the components are set in accordance with the setting information to the terminal device 200 via the communication control unit 101 and causes the display control unit 202 of the terminal device 200 to display the display screen based on the display information.

The display screen that is displayed is used, for example, for management (monitoring) of sensing data by the user. The display screen may be structured in such a manner that the settings of the components can be modified. For example, in a case where a modification of the settings is designated, the screen creation processing in accordance with FIG. 4 can be further executed.

Next, details of a screen created in the present embodiment and a method of setting components for the screen will be described.

Figure 6:
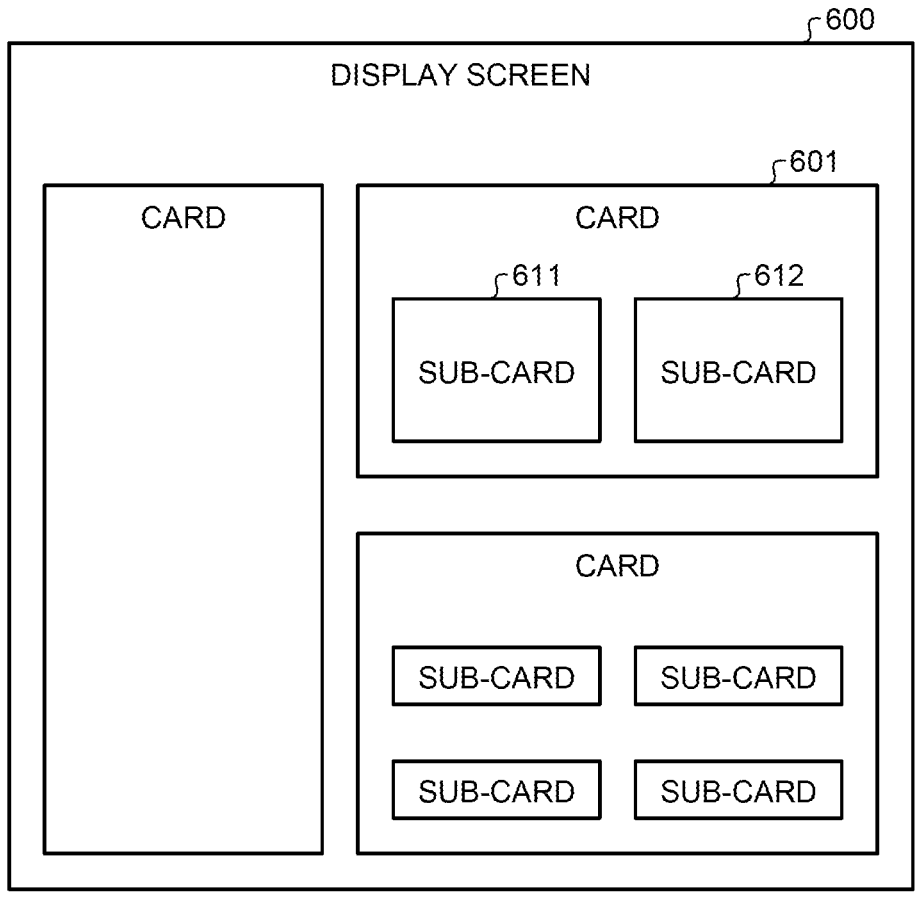
FIG. 6 is a diagram illustrating a structure example of a display screen.

FIG. 6 is a diagram illustrating a structure example of a display screen. A display screen 600 is a screen as a basis for setting components. Illustrated in FIG. 6 is an example of a screen containing a plurality of grouped cards as components. For example, a card 601 includes two sub-cards 611 and 612. The group ID can be set in such a manner that the card 601 and the sub-cards 611 and 612 are included in the same group.

Figure 7:
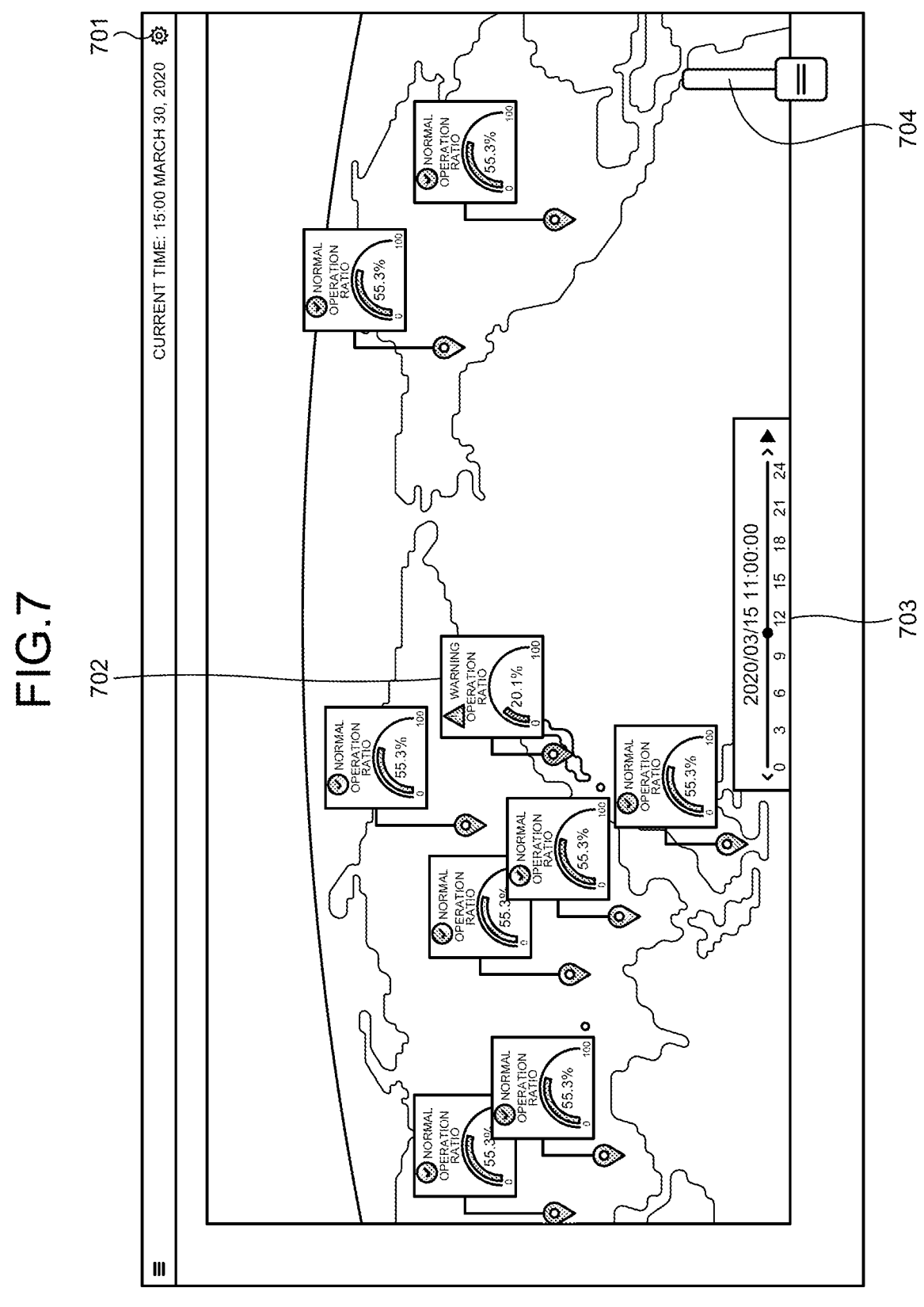
FIG. 7 is a diagram illustrating an example of a display screen on which components are set.

FIG. 7 is a diagram illustrating an example of a display screen on which components are set. FIG. 7 is an example of a screen in which a component that displays a map is disposed in the entire area (content area) where the components are arranged on the display screen 600 (corresponding to the card 601 in FIG. 6) and components that visualize data at a plurality of points in the map and the like are further arranged over this component (corresponding to the sub-cards 611 and 612 of FIG. 6).

A plurality of types of components (cards) to be arranged in the content area are prepared, and here, components prepared for facilitating screen settings of equipment monitoring will be described below. Note that the components described below are examples, and the present disclosure is not limited thereto.

"Map card": a card for displaying a map and location information of each resource included in a resource tree on the map.

"Breadcrumb card": a card for hierarchizing resources.

"Process flow card": a card for displaying a device allocated to a resource or a sensor value of the device as a flow diagram.

"KPIs card": a card for displaying KPIs information allocated to a resource in a gauge graph and a time series graph.

"Operation information card": a card for displaying operation information of a device in a graph.

"VS trend card": a card for displaying, as graphs, various types of trend data acquired by designating a plurality of times and sensor values of a device under a resource.

"Event list card": a card for displaying, in a list, event information of a device under a designated resource or a designated device.

"Sensor list card": a card for displaying, in a list, sensor information of a device under a designated resource or a designated device.

"Time slider card": a card for displaying and operating times of various types of data displayed in the content area.

"Tree card": a card for displaying a resource tree associated with a user and for hierarchical transfer by selection of a resource from the resource tree.

"Magnification and reduction card": a card for magnifying or reducing a screen.

A setting menu button 701 is a button for displaying a setting menu (described later) when pressed. A component 702 is a component for displaying KPIs of an edge device (equipment) provided at a corresponding base on the map. The component 702 may be implemented by, for example, the above-described KPIs card or may be implemented as a part of the function of the above-described map card. The component 702 is displayed in a balloon shape on the upper right of an icon indicating the corresponding base. Note that the components corresponding to the respective bases can be arranged on the map on the basis of information on the latitude and the longitude of the bases.

A component 703 is a time slider (the above-described time slider card) used when data at a specific time is displayed. The component 704 is a component (the above-described magnification and reduction card) for magnifying or reducing the screen. When the maximum magnification is designated by the component 704, a selected component 702 changes to a magnified display.

FIG. 8 is a diagram illustrating a configuration example of a setting menu that is displayed when the setting menu button 701 is pressed. Note that the setting menu button may be set for each component. In any case of pressing a setting menu button of any component, a setting menu similar to that in FIG. 8 is displayed. As illustrated in FIG. 8, the setting menu includes menus as described below.

(M1) Display mode: to switch from an edit mode to a display mode. When clicked, the mode is switched from the edit mode to the display mode, and the notation is changed to "edit mode". When this menu is clicked while the notation is "edit mode", the mode is switched from the display mode to the edit mode, and the notation is changed to "display mode".

(M2) Card palette: to display a palette for selecting a component (card) to be set.

(M3) Add tab: to add a tab to the content area. A component can be set in each tab.

(M4) Screen basic setting: to perform settings for the entire screen.

(M5) Group list: to display a list of settings of groups that are set.

(M6) Card list: to display a list of settings of cards that are set.

(M7) Event settings: to define event settings such as individual data processing.

(M8) Save settings: to save edited setting information in the server device 100 (storage unit 121). To store the setting information means to store in such a manner that the display screen according to the setting information can be displayed.

(M9) Upload setting file: to upload a setting file (file containing setting information) to the server device 100. After the upload, when Save settings of (M8) is clicked, the setting information in the uploaded setting file is stored in the storage unit 121.

(M10) Download setting file: to download a setting file associated with a user who is logged in (logged-in user).

The setting menu may be configured to be displayed only to an authorized user. Furthermore, it may be configured to determine whether or not an operation is allowed for the logged-in user for each of the menus in the setting menu.

FIGS. 9 to 13 are diagrams illustrating examples of screens used for an operation of adding and grouping components (cards). That is, description will be given on the setting operation for the map display and the component arrangement on the map illustrated in FIG. 7. Note that screen examples and others used in the following description will be described as an example different from the map display component (map card), the time slider component (card), or the magnification and reduction component (card) in FIG. 7.

Figure 9:
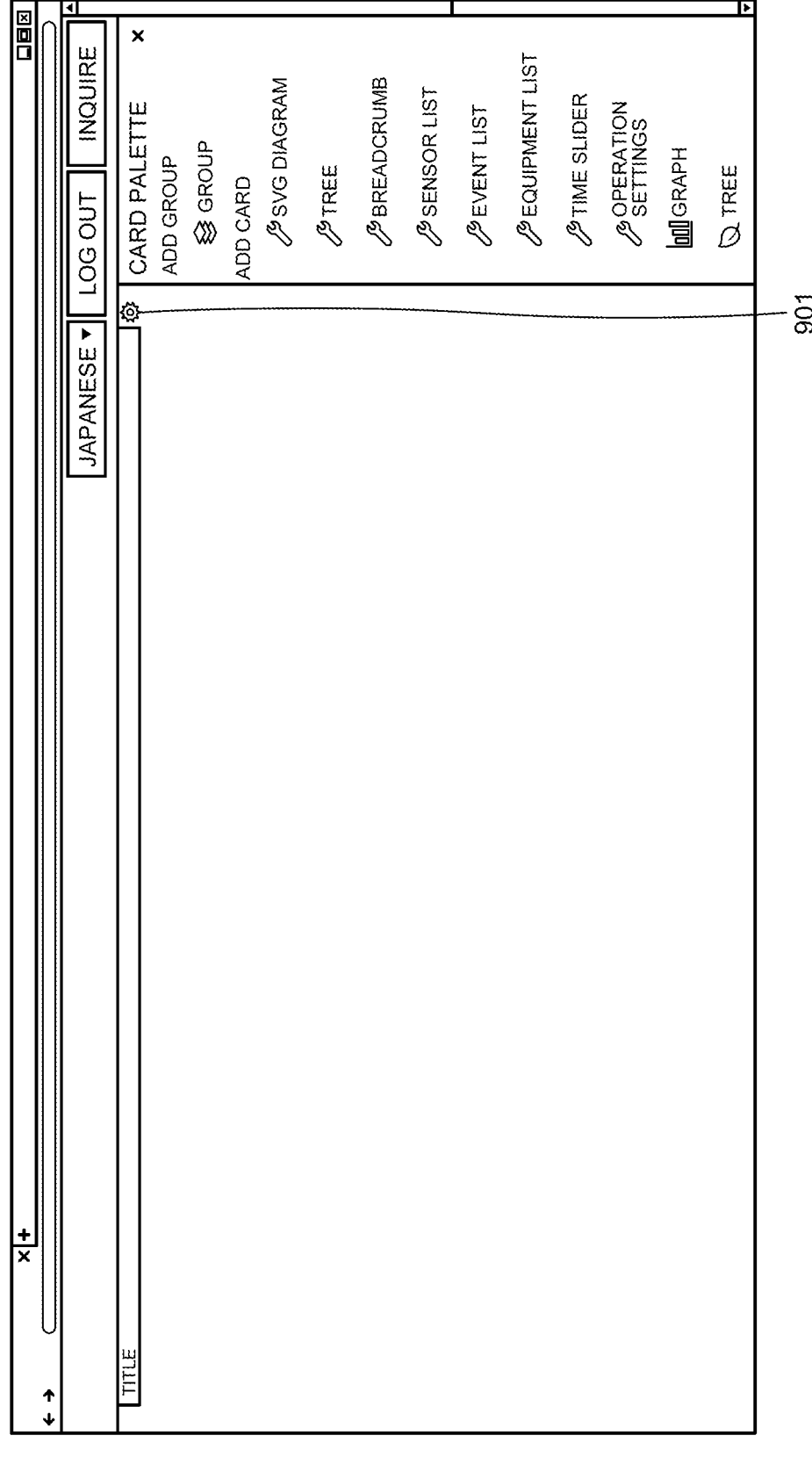
FIG. 9 is a diagram illustrating an example of a display screen containing a card palette.

FIG. 9 is an example of a display screen containing a card palette displayed in a case where the card palette menu is selected. In the card palette, addition of a group and addition of various cards can be selected. Description will be given by referring to FIG. 7 that the map display component and the time slider component (card) and the magnification and reduction component (card) to be displayed on the map are arranged by card adding operations.

When addition of a group is selected, the display control unit 103 arranges the group in the content area. That is, as illustrated in FIG. 7, the map display and the time slider and magnification and reduction components (cards) on the map are arranged. A group can be interpreted as a component for further arranging one or more other components.

FIG. 10 is a diagram illustrating an example of a card setting screen in a case where a setting menu button 901 for a group is pressed for setting a group for the arranged components (cards) on the card palette screen of FIG. 9. A group ID of the added group is set in a group ID field. By denoting the group ID in the group ID field of another card, this card can be added to the group having the same group ID. Describing with the display example of FIG. 7, a group ID set to the map display component is set as the group ID of the time slider component (card) and the magnification and reduction component (card). Note that the group ID may be automatically set in the group ID field.

FIG. 11 is a diagram illustrating a display example of cards before a predetermined component (graph viewer to be described later) is added to a group (describing with the display example of FIG. 7, illustrating a state before the time slider component (card), the magnification and reduction component (card), and others are added to the group in a state where the map is displayed). FIG. 11 is a diagram illustrating a situation in which, for example, a component 1101 (graph viewer) for displaying a graph is added by a card addition function. In this example, it is merely that the component 1101 is added on the display screen, and the component 1101 can be added to the group by modifying the settings of the added component 1101.

FIG. 12 is a diagram illustrating an example of the card setting screen in a case where a setting menu button of the component 1101 (graph viewer) is pressed. For example, by inputting the group ID displayed on the card setting screen of FIG. 10 in the group ID field, the component 1101 can be added to the group having this group ID. When a confirmation button is pressed, additional settings are reflected, and a display screen as illustrated in FIG. 13 is displayed.

Figure 13:
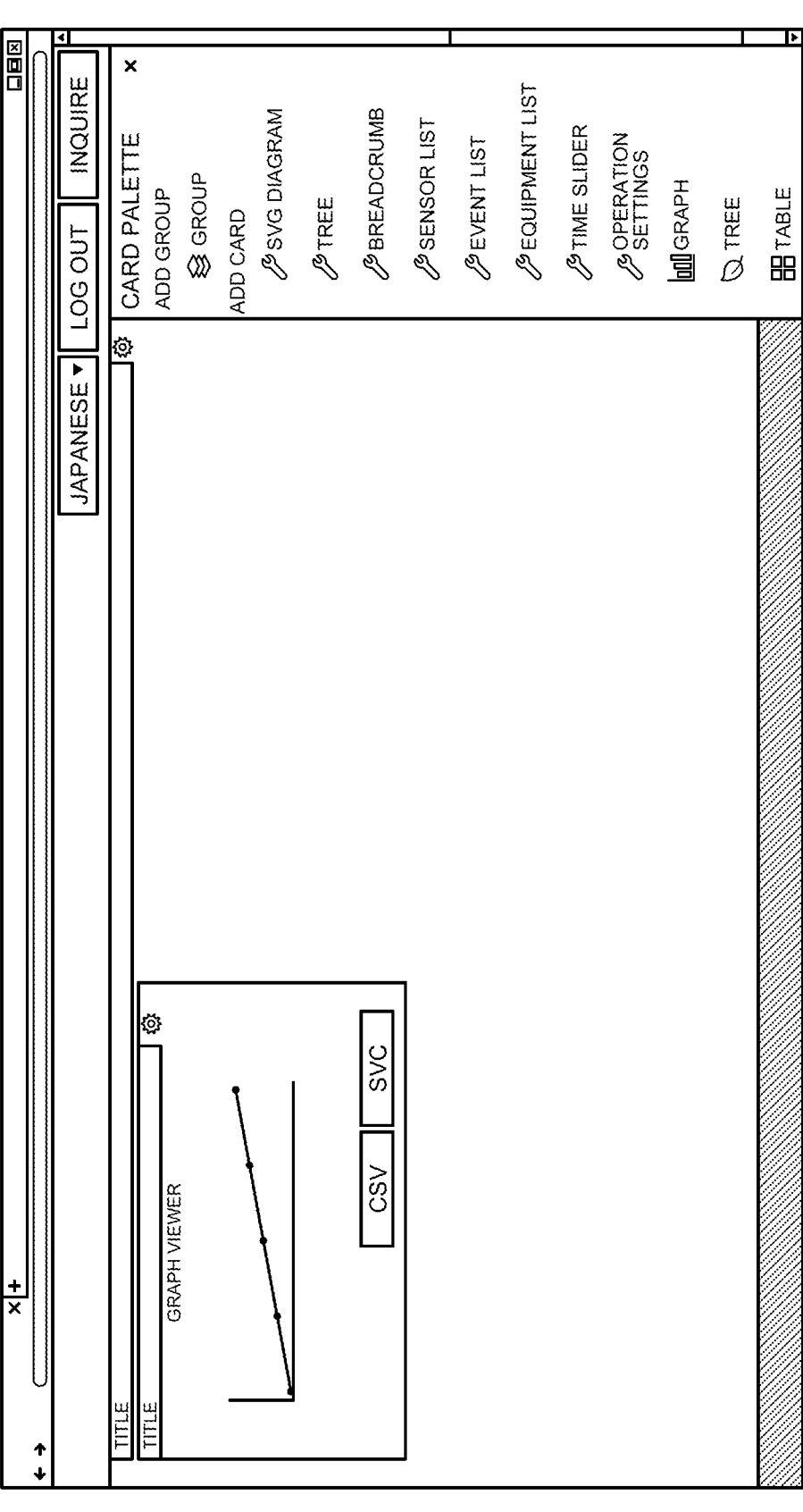
FIG. 13 is a diagram illustrating an example of a display screen after a component is added to a group.

FIG. 13 is a diagram illustrating an example of a display screen after the component 1101 is added to the group. As illustrated in FIG. 13, the component 1101 is disposed inside the component indicating the group added in FIG. 9. In FIG. 13, the description is given focusing on the point that the component 1101 (graph viewer) is added to the group and disposed in the content area. Meanwhile, setting the same group ID as that of the map display component (map card), the KPIs card, the time slider card, and the magnification and reduction card in FIG. 7 results in the component 1101 (graph viewer) additionally displayed in the content area illustrated in FIG. 7.

Next, detailed settings (such as inter-component cooperation) for the components (cards) arranged in the content area by the above-described operation will be described.

Figure 14:
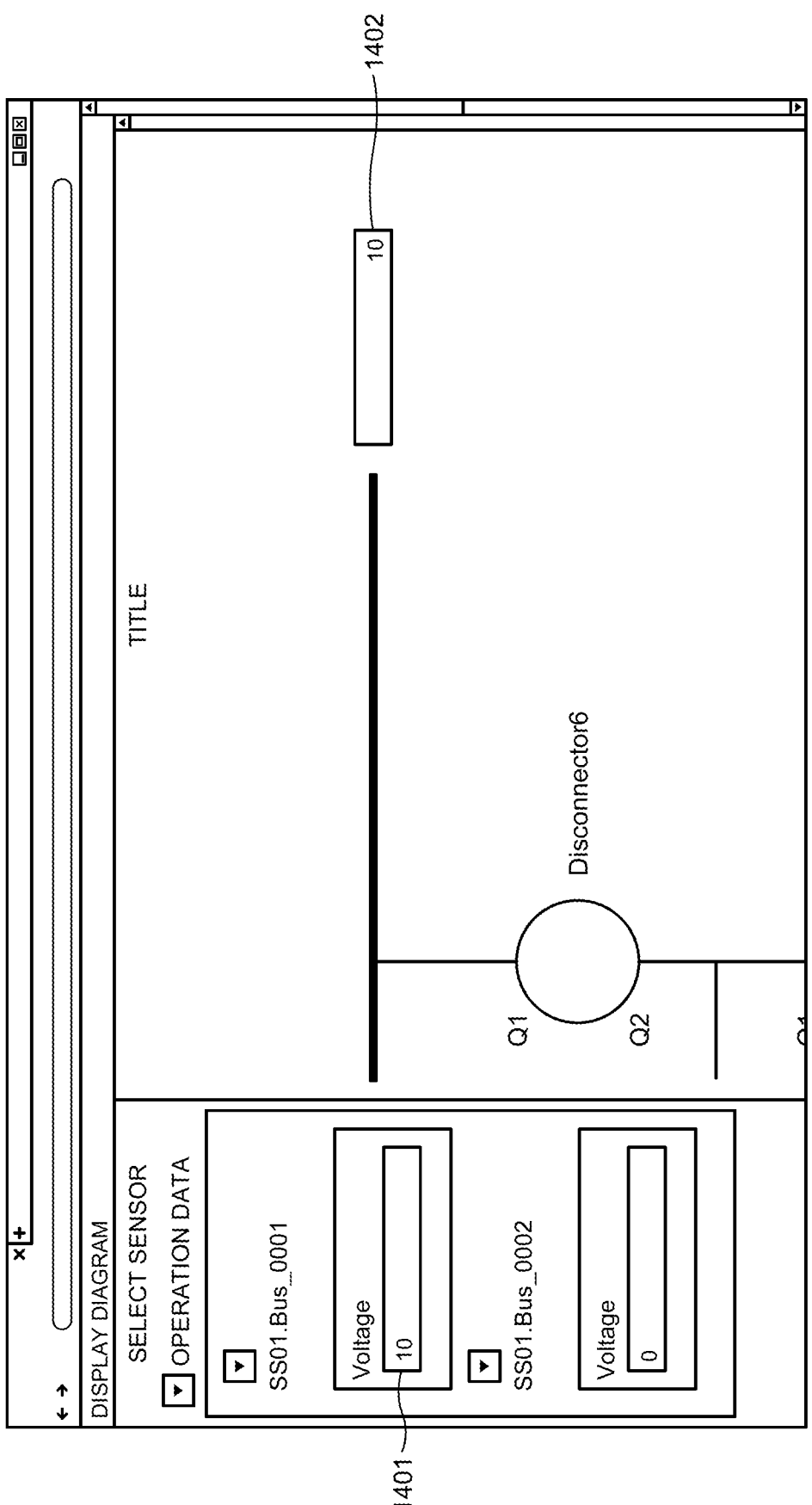
FIG. 14 is a diagram illustrating an example of cooperation of a plurality of components.

FIG. 14 is a diagram illustrating an example of cooperation of a plurality of components. FIG. 14 illustrates an example in which modifying a value in a voltage display field 1401 in a component for sensor selection results in modification of a voltage display field 1402 in a component for displaying an image on the right side in conjunction with the modification.

FIG. 15 is a diagram illustrating an example of a setting screen for setting cooperation between components. FIG. 15 is a diagram illustrating an example of setting an operation (method) for an event (item-property-changed) issued when an input value is modified as in the voltage display field 1401 in FIG. 14.

Details of the operation are set, for example, by describing a script by a predetermined script language (for example, Javascript) in a script field. For example, information of components as the issuing source and the issuing destination of the event is passed as an argument and can be used in the script. In the example of FIG. 14, a script is described such as acquiring the value in the voltage display field 1401 in the component as the issuing source of the event and setting the value in a specific text in the component as the issuing destination.

Figure 16:
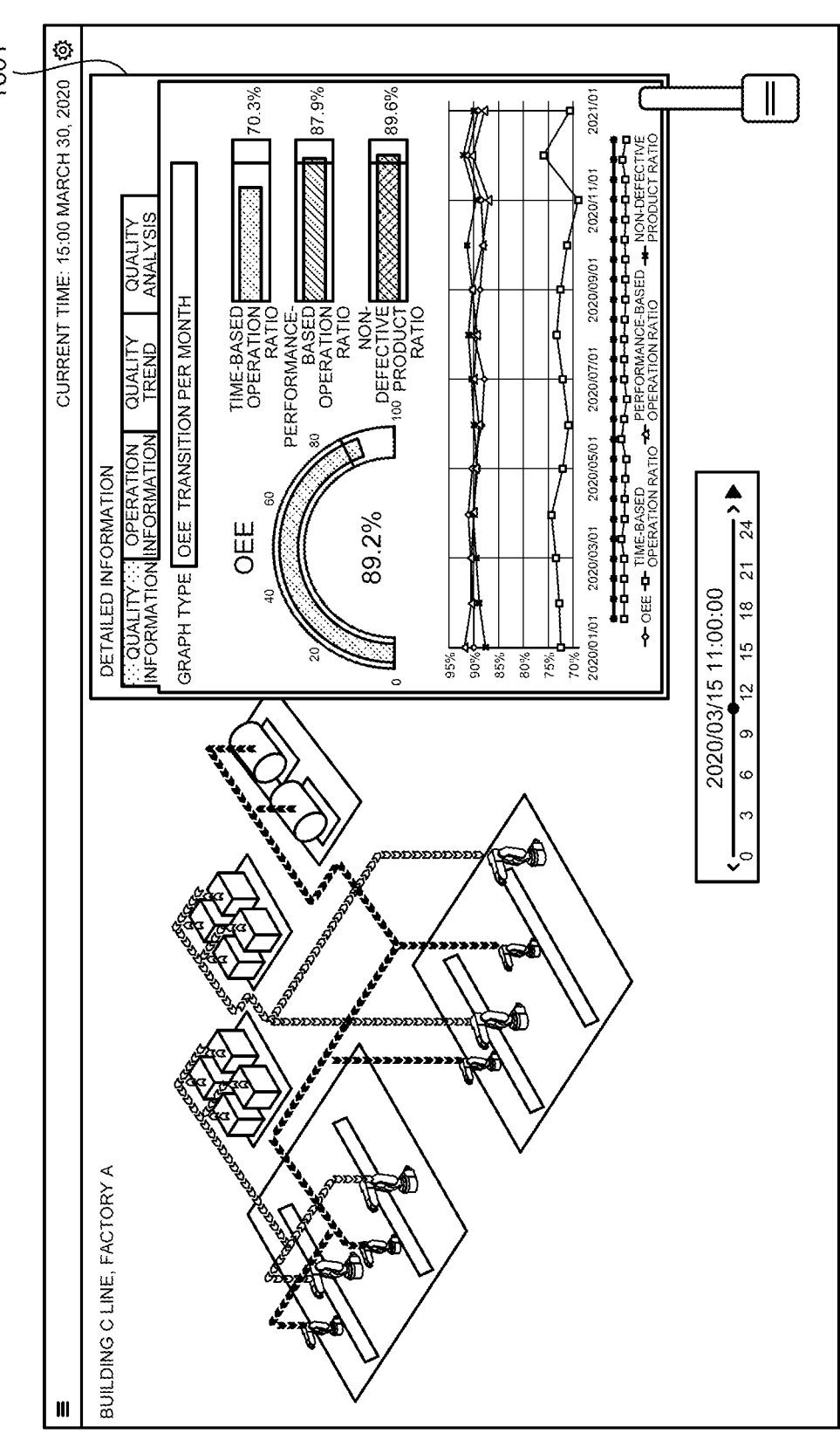
FIG. 16 is a diagram illustrating an example of a display screen displaying quality information.

FIG. 16 is a diagram illustrating an example of a display screen for displaying quality information of an electronic device that is currently selected. A component 1601 includes a plurality of tabs. The plurality of tabs can be switched and displayed as appropriate. Illustrated in FIG. 16 is a display example of a "quality information" tab for displaying KPIs. In the "quality information" tab, the KPIs card is disposed. This KPIs card is prepared in advance as described above, and some KPIs are displayed separately in upper and lower parts as illustrated in FIG. 16. In the upper part, the latest values of various types of KPI information at a designated time are displayed as gauge graphs, and in the lower part, the latest values are displayed as time-series graphs.

In the "quality information" tab, overall equipment effectiveness (OEE), which is a representative KPI of the electronic device (equipment) that is currently selected, is displayed by a gauge, and the other three KPIs (a time-based operation ratio, a performance-based operation ratio, and a non-defective product ratio) are displayed by bar graphs. Meanwhile, in the lower part, time-series changes of the four KPIs are displayed in graphs.

Figure 17:
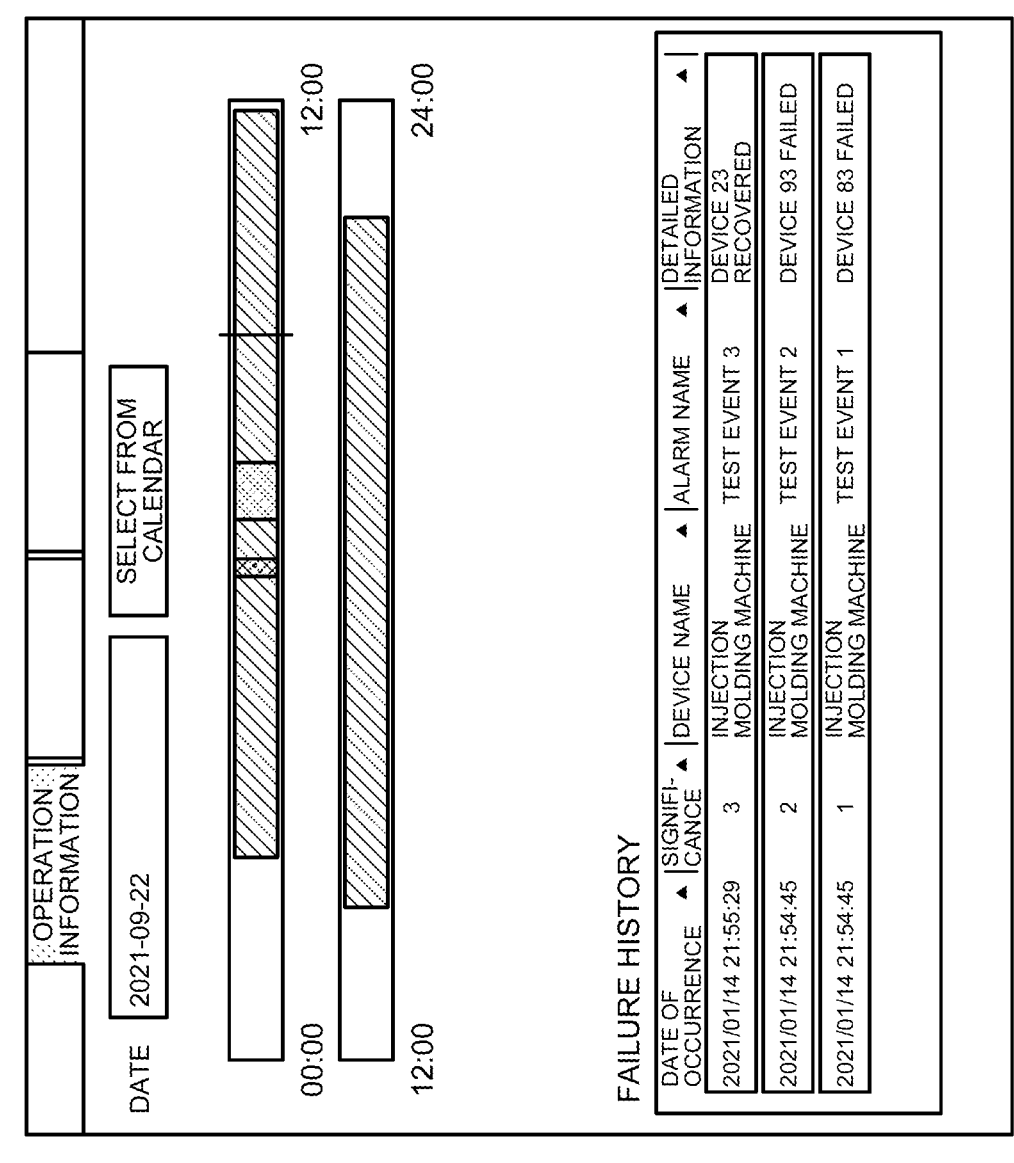
FIG. 17 is a diagram illustrating an example of a display screen in a case where an "operation information" tab is selected.

FIG. 17 is a diagram illustrating an example of a display screen in a case where an "operation information" tab is selected. In the "operation information" tab, the operation information card is disposed, and detailed operation information of an electronic device that is selected can be browsed. For example, the operation information is displayed as a band graph, and a failure history of the selected electronic device is displayed in a list form. For example, by setting the sensor value as a value per minute, it is also possible to display the sensor value in different colors depending on the operation state (the operation, planned stop, a device trouble, etc.)

Figure 18:
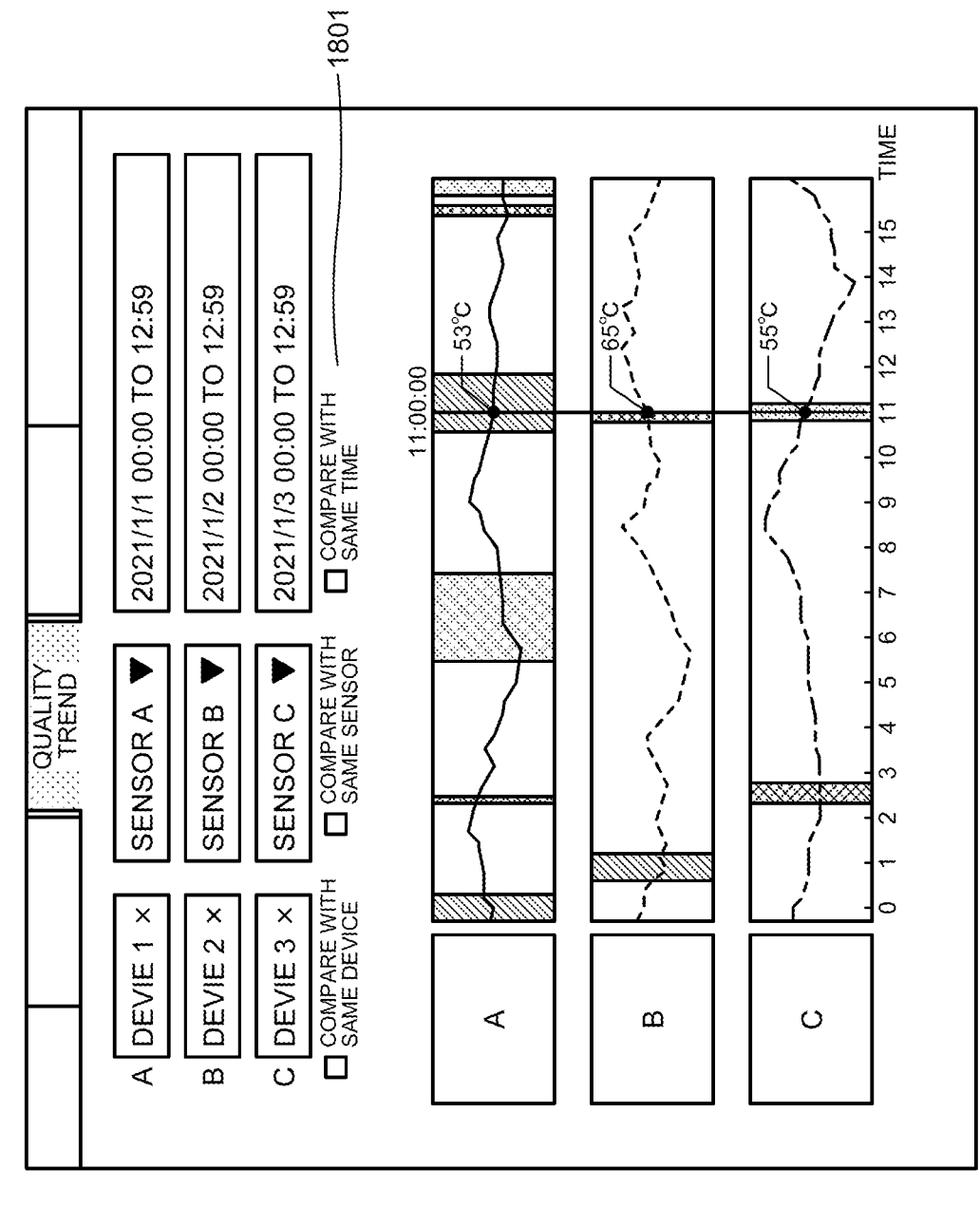
FIG. 18 is a diagram illustrating an example of a display screen in a case where a "quality trend" tab is selected.

FIG. 18 is a diagram illustrating an example of a display screen in a case where a "quality trend" tab is selected. In the "quality trend" tab, the VS trend card is disposed, and it is possible to compare information among a plurality of electronic devices, a plurality of sensors, and a plurality of times (periods). In the example of FIG. 18, three sets (A, B, and C) can be selected as for the electronic device, the sensor, and the time. In a sensor field, it is possible to select a sensor included in an electronic device selected in an electronic device field. For each of the sets, a graph illustrating time-series changes in data (such as values of sensing data) detected in a selected period by a selected sensor is displayed in the lower part.

As illustrated in FIG. 18, the "quality trend" tab includes checkboxes 1801 for setting at least one of the electronic device, the sensor, and the time to the same value (fixed value).

For example, in a case where "compare with same device" is checked as comparison targets with the set A, the same electronic device as that in the set A is set for the sets B and C. In a case where "compare with same sensor" is checked, the same sensor as that in the set A is set for the sets B and C. In a case where "compare with same time" is checked, the same time as that in the set A is set for the sets B and C.

In a case where it is designated that any element among the electronic device, the sensor, and the time is set to a fixed value, only elements other than the element set to the fixed value can be set to different values among the plurality of sets. With such a configuration, for example, trends of sensing data of the same type of sensors included in different electronic devices can be compared.

Figure 19:
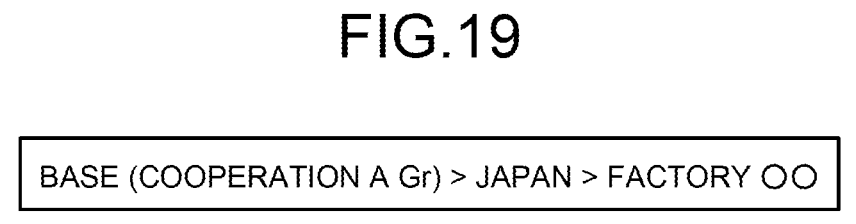

FIG. 19 is a diagram illustrating a display example of the breadcrumb card. The breadcrumb card is a component representing a master-slave relationship of a selected electronic device (equipment). With the breadcrumb card, for example, a host of a selected electronic device (equipment) can be easily selected. As illustrated in FIG. 19, in the breadcrumb card, the hierarchy of the selected electronic device (equipment) is divided by a symbol ">" and displayed. When a certain class is clicked, the clicked class is changed to a selected state.

FIG. 20 is a diagram illustrating a display example of the tree card. The tree card is a component for representing a hierarchical relationship of electronic devices (equipment). When a "−" icon is clicked, information of an expanded class is folded for display and is changed to, for example, a "+" icon. When the "+" icon is clicked, the information of the class that is folded is expanded and displayed and is changed to a "−" icon.

An icon corresponding to the type of the electronic device (equipment) may be further displayed. In addition, the tree card may have a function for performing search by the name (or partial match retrieval).

FIG. 21 is a diagram illustrating a display example of the sensor list card. The sensor list card is a component that displays a list of sensors included in the selected electronic device.

Figure 22:
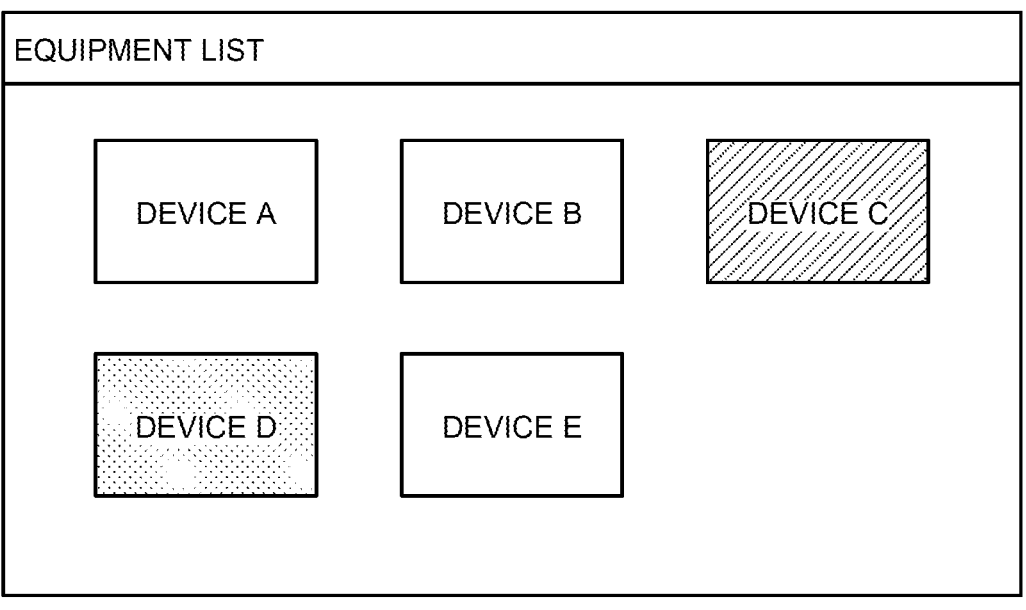
FIG. 22 is a diagram illustrating a display example of an equipment list card.

FIG. 22 is a diagram illustrating a display example of an equipment list card. The equipment list card is a component that displays a list of electronic devices (equipment) included in a selected base (location) by icons. The equipment list card may be configured to change a display mode (display color or others) of an icon of an electronic device in which an alarm (warning) is generated.

As described above, according to the present embodiment, it is possible to execute predetermined component arrangement, cooperation setting, and others using the GUI, and thus, it is possible to create a screen more efficiently.

Figure 23:
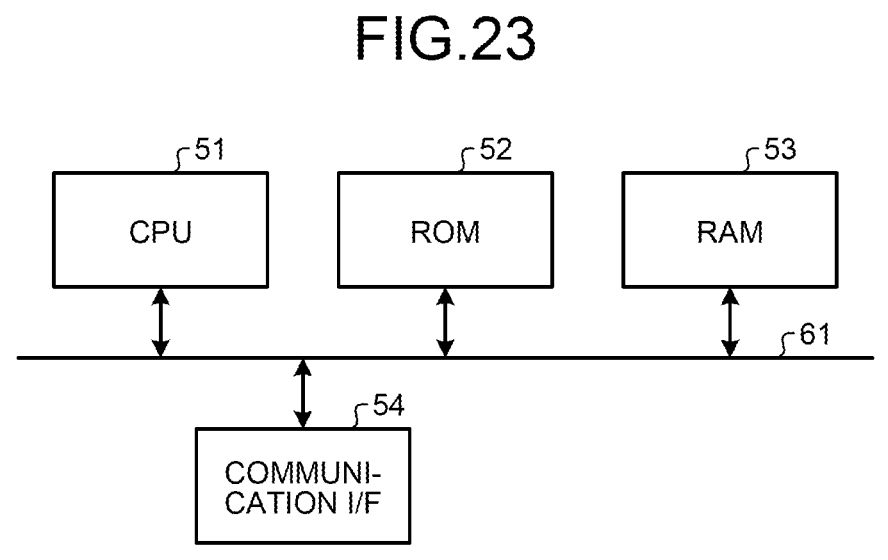

Next, a hardware configuration of the information processing device according to the embodiment will be described with reference to FIG. 23. FIG. 23 is an explanatory diagram illustrating a hardware configuration example of the information processing device according to the embodiment.

The information processing device according to the embodiment includes a control device such as a CPU 51, storage devices such as a read only memory (ROM) 52 and a RAM 53, a communication I/F 54 that is connected to a network and performs communication, and a bus 61 that connects the units.

A program executed by the information processing device according to the embodiment is provided by being incorporated in the ROM 52 or the like in advance.

The program executed by the information processing device according to the embodiment may be provided as a computer program product by being recorded as a file in an installable format or an executable format in a computer-readable recording medium such as a compact disk read only memory (CD-ROM), a flexible disk (FD), a compact disk recordable (CD-R), or a digital versatile disk (DVD).

Furthermore, the program executed by the information processing device according to the embodiment may be stored on a computer connected to a network such as the Internet and provided by being downloaded via the network. Furthermore, the program executed by the information processing device according to the embodiment may be provided or distributed via a network such as the Internet.

The program executed by the information processing device according to the embodiment can cause a computer to function as each of the units of the information processing device described above. In this computer, the CPU 51 can read the program from a non-transitory computer-readable storage medium onto a main storage device and execute the program.

Although some embodiments of the present invention have been described, these embodiments have been presented as examples and are not intended to limit the scope of the invention. These novel embodiments can be implemented in various other forms, and various omissions, substitutions, and modifications can be made without departing from the spirit of the invention. These embodiments and modifications thereof are included in the scope and the spirit of the invention and are included in the invention described in the claims and the equivalent scope thereof.

What is claimed is:

1. An information processing device comprising:
one or more hardware processors configured to function as:
a display control unit that displays a display screen for arranging a plurality of components, each having a predetermined function;
a reception unit that receives settings of the plurality of components designated using the display screen; and
a storage control unit that stores, in a storage device, setting information indicating the settings received, wherein
the display control unit displays the display screen on which the plurality of components are set in accordance with the setting information,
the plurality of components includes a first component that allows selection of an electronic device, a detection device equipped in the electronic device, and a period in which sensing data is detected by the detection device, and that displays sensing data that is detected in the period and that is detected by the detection device selected, and
the first component is configured to:
select a plurality of sets of the electronic device, the detection device, and the period; and
in a case where one or two elements among the electronic device, the detection device, and the period are designated to be set to a fixed value, set only elements other than the one or two elements set to the fixed value to different values between the plurality of sets.

2. The information processing device according to claim 1, wherein
the plurality of components includes a first component and a second component,
the display control unit further displays a setting screen for setting cooperation information indicating an operation of the second component in response to an operation of the first component, and
the storage control unit stores the setting information containing the cooperation information in the storage device.

3. The information processing device according to claim 1, wherein
the plurality of components includes a component that displays one or more pieces of sensing data detected by one or more detection devices equipped in one or more electronic devices.

4. The information processing device according to claim 1, wherein
the display control unit displays, to a user who is authorized to set a component, the display screen containing a function for setting the component.

5. The information processing device according to claim 1, wherein
the setting information includes:
first setting information defined for each of a plurality of users;
second setting information defined for each authority given to each of the plurality of users; and
third setting information defined in common for the plurality of users, and
the display control unit displays the display screen in which components are set in accordance with any setting information selected depending on a priority determined for each of the first setting information, the second setting information, and the third setting information.

6. The information processing device according to claim 1, wherein
the display control unit displays the display screen on which components are set in accordance with predetermined default setting information, and
the reception unit receives settings of the components designated by a user using the display screen on which the components are set in accordance with the default setting information.

7. The information processing device according to claim 1, wherein
the reception unit receives input of sensing data from a server device that collects the sensing data detected by one or more detection devices equipped in one or more electronic devices, and
the plurality of components includes a component that displays the sensing data.

8. The information processing device according to claim 1, wherein the first component is configured to:
in a case where one or two elements among the electronic device, the detection device, and the period are designated by a user to be set to a same value, set each of values of the designated elements of one or more sets other than a first set among the plurality of sets to a value of the designated elements of the first set.

9. An information processing method executed by a computer of an information processing device, the method comprising:
a display control step of displaying a display screen for arranging a plurality of components, each having a predetermined function;
a reception step of receiving settings of the plurality of components designated using the display screen; and
a storage control step of storing, in a storage device, setting information indicating the settings received, wherein
the display control step includes displaying the display screen on which the plurality of components are set in accordance with the setting information,
the plurality of components includes a first component that allows selection of an electronic device, a detection device equipped in the electronic device, and a period in which sensing data is detected by the detection device, and that displays sensing data that is detected in the period and that is detected by the detection device selected, and
the first component is configured to:
select a plurality of sets of the electronic device, the detection device, and the period; and
in a case where one or two elements among the electronic device, the detection device, and the period are designated to be set to a fixed value, set only elements other than the one or two elements set to the fixed value to different values between the plurality of sets.

10. A computer program product having a non-transitory computer readable medium including instructions stored thereon, wherein the instructions, when executed by a computer, cause the computer to execute:
a display control step of displaying a display screen for arranging a plurality of components, each having a predetermined function;
a reception step of receiving settings of the plurality of components designated using the display screen; and a storage control step of storing, in a storage device, setting information indicating the settings received, wherein the display control step includes displaying the display screen on which the plurality of components are set in accordance with the setting information, the plurality of components includes a first component that allows selection of an electronic device, a detection device equipped in the electronic device, and a period in which sensing data is detected by the detection device, and that displays sensing data that is detected in the period and that is detected by the detection device selected, and the first component is configured to:

select a plurality of sets of the electronic device, the detection device, and the period; and in a case where one or two elements among the electronic device, the detection device, and the period are designated to be set to a fixed value, set only elements other than the one or two elements set to the fixed value to different values between the plurality of sets.

\* \* \* \* \*